United States Patent [19]

Cunningham

[11] Patent Number: 5,917,575
[45] Date of Patent: Jun. 29, 1999

[54] SPLIT RIM EYEGLASS FRAME MOUNTING

[76] Inventor: Alan Cunningham, P.O. Box 308, Tafton, Pa. 18464

[21] Appl. No.: 09/063,442

[22] Filed: Apr. 21, 1998

[51] Int. Cl.⁶ ...................................................... G02C 1/08
[52] U.S. Cl. .............................................. 351/90; 351/141
[58] Field of Search .............................. 351/90–101, 140, 351/141; 411/15, 44, 60

[56] References Cited

U.S. PATENT DOCUMENTS

| | | | |
|---|---|---|---|
| 2,080,853 | 5/1937 | Nelson | 351/140 |
| 2,210,507 | 8/1940 | Spill | 351/153 |
| 4,153,347 | 5/1979 | Myer | 351/90 |
| 4,256,387 | 3/1981 | Kato | 351/90 |
| 4,521,090 | 6/1985 | Pierquin | 351/124 |
| 4,776,685 | 10/1988 | Jeunet | 351/90 |
| 4,813,775 | 3/1989 | Kaksonen | 351/92 |
| 4,986,647 | 1/1991 | Blumenthal | 351/51 |
| 5,011,274 | 4/1991 | Wagner | 351/90 |
| 5,270,743 | 12/1993 | Hofmair et al. | 351/86 |
| 5,315,328 | 5/1994 | Hofmair et al. | 351/121 |
| 5,418,580 | 5/1995 | Sondrol | 351/47 |
| 5,418,581 | 5/1995 | Conway | 351/116 |
| 5,579,062 | 11/1996 | Sondrol | 351/92 |

*Primary Examiner*—Huy Mai
*Attorney, Agent, or Firm*—Liniak, Berenato, Longacre & White LLC

[57] ABSTRACT

A split rim eyeglass frame mounting system is provided. The locking mechanism comprises a lens holder for surrounding and securing a rim of a ophthalmic lens. The lens holder is split at a position to define first and second portions. A locking element is disposed on the first portion and extends towards the second portion. The element includes a base and a locking portion. The base portion is disposed at a proximal end of the element adjacent to the first portion. The locking portion is disposed at a distal end of the element and is greater in width than the base portion. The locking portion includes a slot at its distal end. The slot defines oppositely disposed resilient first and second tabs. A locking compartment is disposed on the second portion. The locking compartment includes first and second cooperating recesses for receiving and securing the first and second tabs respectively.

8 Claims, 2 Drawing Sheets

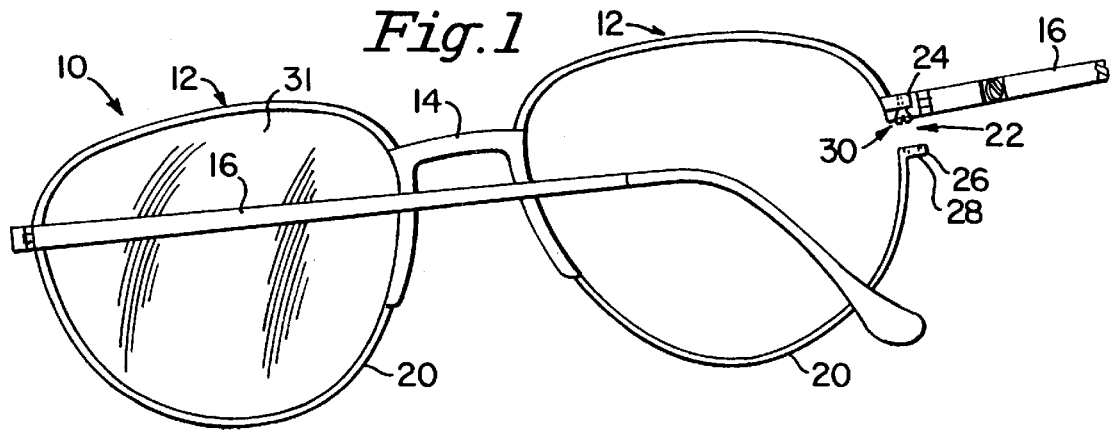
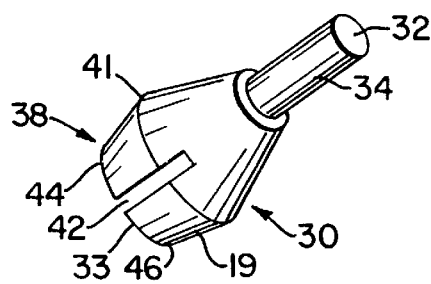
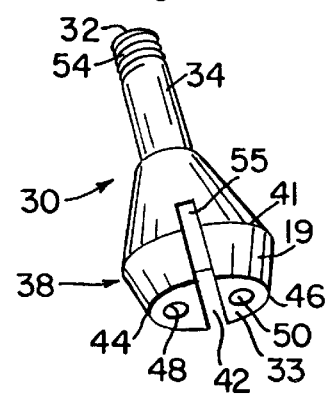
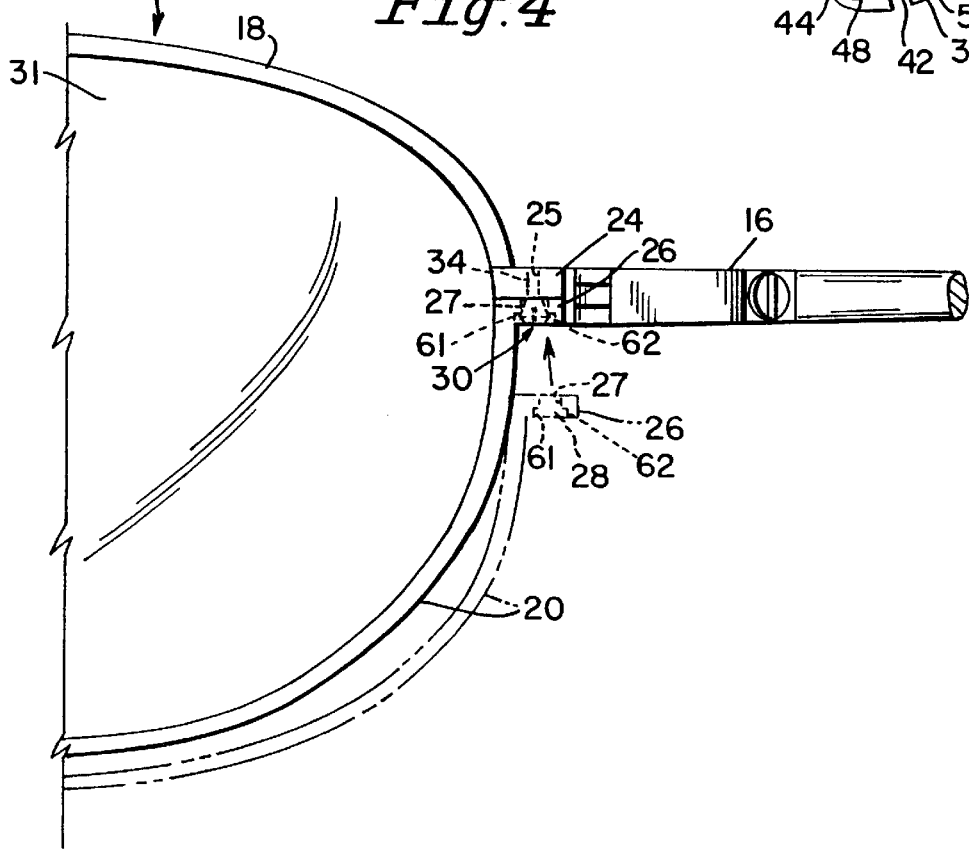

SPLIT RIM EYEGLASS FRAME MOUNTING

FIELD OF THE INVENTION

This invention relates to eyeglass frames. More specifically, the present invention relates to a locking mechanism for securing the top and bottom rims of a non-pliable eyeglass frame, that further allows the selective insertion and extraction of opthalmic or corrective lenses, without the use of a screw or other threaded fastener.

BACKGROUND OF THE INVENTION

The need for eyeglasses has become an unfortunate reality for an increasing number of individuals. In the case of prescription eyeglasses, separate lenses are required to be inserted into and retained by an eyeglass frame. During the useful life of a single pair of eyeglass frames, it is likewise not uncommon to face a situation where an eyeglass wearer might require new or different lenses due to, for example, a change in prescription or damage to the lens. A not insignificant problem has arisen, since eyeglass frames need to allow for easy insertion and removal of lenses when a change is required, and also provide superior retention of lenses once properly positioned in the frame.

In plastic eyeglass frames, the lenses are often replaced and secured by softening the frame with heat and thereafter inserting the lenses into the softened frame. So called non-pliable eyeglass frames refer to frames that are made of materials other than plastic, such as metal and the like. In such non-pliable frames, a screw or threaded steel post is often used to tighten and secure the frame around the lenses. Lens replacement in non-pliable eyeglass frames has generally been accomplished by removal of the screw or threaded post which secures the top and bottom rim of the frames together. The screw is inserted through a bore in the top rim of a split rim eyeglass frame, and then connects to a receiving bore on the lower rim with the screw threads mating with the threads present inside the receiving bore in the lower rim.

This design has several disadvantages. During the useful life of the frames, the screw is repeatedly turned in the same direction to tighten the upper and lower rims around the lens. Over time the rims are subjected to vibration and other forces that tend to loosen the connection and cause the screw to back out of its tightened connection. In addition, repeated tightening of this connection often leads to damage to the frame as a result of bending or scratching caused by the tightening tool. Furthermore, the slot located on the head of the screw, the threads on the screw and inside the receiving lower rim are subject to wear and deformation from repeated tightening and loosening operations and the forces associated therewith. While the screw is the primary frame locking mechanism used in current industry practice, several alternative eyeglass frame locking mechanisms have been suggested.

For instance, in U.S. Pat. No. 5,270,743 to Hofmair et al, discloses a split rim eyeglass frame which includes two lens holding rings that share a common top rim. The bottom rim of the frame features integral coupling hooks and that engage cooperating recesses on the top rim of the frame to secure lenses therein. One primary disadvantage of this structure is that it requires the lens to be removed before the top and bottom rims can be disengaged. Repeated lens removals tend to weaken the frame and increase the risk of damage to lenses. In this device, the locking mechanism is not readily accessible, nor is it capable of being unlocked while the lens remains inside the frame.

U.S. Pat. No. 4,813,775 to Kaksonen, teaches a split rim eyeglass frame which includes an integral spring-mounted locking mechanism to allow the lens holders to expand for removal of the lens. The locking mechanism allows for repeated lens insertion and removal, but the frames must be manufactured specifically to accommodate it. In addition, it is foreseeable that the resilient clip used to lock the frame in place could rather easily be bent, twisted or otherwise deformed. Since only one spring mounted button on the frame needs to be depressed to unlock the frames, the possibility for undesired disengaging of the locking mechanism through inadvertent contact has no safeguard.

U.S. Pat. No. 2,080,853 to Nelson discloses an opthalmic mounting for attaching a nose pad to an eyeglass frame. A locking mechanism permits the nose pad to be movably mounted to the frame. The mounting includes two spaced fingers, each of which has a notch on its outer edge. The nose pad is mounted from the frame by pressing the two fingers together and inserting them into a receiving loop. Since the fingers of the locking mechanism are flat, they can easily be bent or otherwise damaged during insertions or removals. Further, in order to release the locking mechanism, it is necessary to squeeze the fingers of the mechanism together and push them through the receiving loop.

Thus, there is a need in the art for an eyeglass frame locking mechanism which is durable and can be repeatedly inserted and secured easily within a cooperating locking compartment and does not require the use of a threaded fastener. It is a purpose of this invention to fulfill this and other needs in the art which will become more apparent to the skilled artisan once given the following disclosure.

SUMMARY OF THE INVENTION

It is an object of the invention to provide a locking mechanism for split rim eyeglass frames without requiring the use of a screw or other products.

It is a further object of this invention to provide a locking mechanism for eyeglass frames in which the lens can be easily replaced.

Generally speaking, this invention fulfills the above-described needs in the art by providing an ophthalmic frame locking mechanism, comprising a lens holder for surrounding and securing a rim of a ophthalmic lens. The lens holder is split at a position to define first and second portions. A locking element is disposed on the first portion and extends towards the second portion. The element includes a base and a locking portion. The base portion is disposed at a proximal end of the element adjacent to the first portion. The locking portion is disposed at a distal end of the element and is greater in width than the base portion. The locking portion includes a slot at its distal end. The slot defines oppositely disposed resilient first and second tabs. A locking compartment is disposed on the second portion. The locking compartment includes first and second cooperating recesses for receiving and securing the first and second tabs respectively.

This invention will now be described with respect to certain embodiments thereof as illustrated in the following drawings, wherein:

BRIEF DESCRIPTION OF THE DRAWINGS

FIG. 1 is a perspective view of the eyeglass frames in the condition according to the preferred embodiment;

FIG. 2 is a rear perspective view of the locking element;

FIG. 3 is a front perspective view of the locking element according to the present invention;

FIG. 4 is a partial front view of the eyeglass frames;

FIG. 8 is a perspective view in section of an alternative embodiment of the locking element, showing right angle tabs rather than tapered tabs included in FIG. 7.

DETAILED DESCRIPTION OF THE PREFERRED EMBODIMENT

Figure 5:
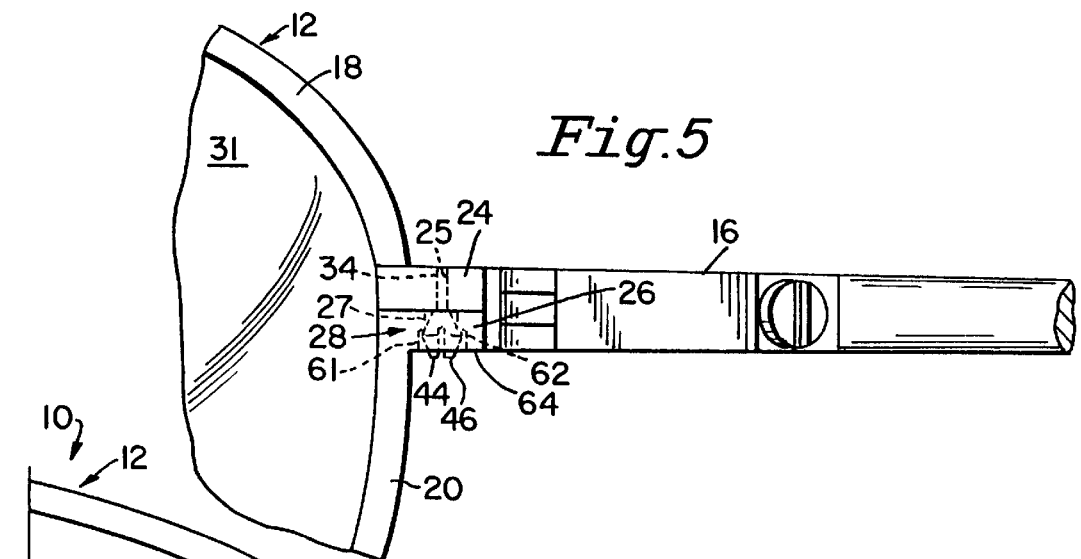
FIG. 5 is a partial front view of an alternative embodiment of the eyeglass frames in the locked condition.

Attention is now directed to FIG. 1 of the drawings. In this Figure, there is illustrated an exemplary split rim eyeglass frame 10. The frame 10 is formed from metal, in the preferred embodiment, but may be formed from any other suitable material.

Frame 10 includes two lens holders 12 which are designed to secure a lens within the eyeglass frame 10. The lens holders 12 are connected by way of a bridge 14. Each lens holder 12 is connected to a temple member 16 which is used to secure the glasses about the face of the user.

Each lens holder 12 is not continuous, but instead split at a position 22 to define a top rim 18 and bottom rim 20. While the eyeglass frame of FIG. 1 only shows one lens holder 12 split at position 22, it should be understood that both lens holders 12 are split in a like manner. Top rim 18 includes a lug 24 at split position 22 which is designed to cooperate with and contact lug 26 of bottom rim 20 where the frame 10 is secured. Each lug 24 and 26 includes a bore 25 and 27 respectively through its surface, so that when lugs 24 and 26 are aligned to be locked, a single bore extends through the cooperating lugs.

In prior devices, a screw has typically been used to secure the top rim 18 to the bottom rim 20. The screw is inserted through the top lug 24 and secured to the internal threads contained in the connecting lugs 24 and 26 of top rim 18 and bottom rim 20. However, in the present invention, a selectively releasable non-threaded locking element 30 is used to secure the top rim 18 to the bottom rim 20.

In the preferred embodiment, a base portion 34 of locking element 30 is releasably secured within lug 24, with the locking portion 38 adapted to be inserted and automatically locked within locking compartment 28 of lug 26. The locking element 30 is designed so that the lens 31 may be securely held within frame 10, yet can be selectively released and replaced with relative ease.

Referring now to FIG. 1–4, locking element 30 will be described in more detail.

Locking element 30 includes a proximal end 32, a distal end 33, a base portion 34, and a locking portion 38. The base portion 34 is located at the proximal end 32 of locking element 30 while the locking portion 38 is located at the distal end of locking element 30. Base portion 34 is preferably cylindrical in shape, and with a diameter close in dimension to that of the bore of lug 24 to facilitate attachment therein. It should be understood, however, that base portion 34 may also take other suitable shapes which, as long as a sufficient surface area is provided in base portion 34 to allow it to be secured within the bore 25 of lug 24. Base portion 34 is secured within the bore 25 of lug 24, by welding, glueing, embedding, or other permanent attachment means.

Preferably, base portion 34 of locking element 30 extends substantially all the way through bore 25 of lug 24. However, it should be understood that base portion 34 of locking element 30 may extend only partially through bore 25 as long as it remains securely and permanently attached.

Alternatively, the base portion 34 can include a threaded portion 54 at proximal end 32, as illustrated in FIG. 3. In this embodiment, a portion of the interior of lug 24 will also be threaded, in order to mate and cooperate with the threads of a securing screw. The internal threads of lug 24 therefore can be used to receive the threaded end 54 of locking element 30, without requiring the base portion 34 to be permanently attached to lug 24.

Extending from base portion 34 is a locking portion 38. The locking portion 38 can take on a variety of different shapes. Locking portion 38 has a larger circumferential dimension than that of base portion 34. In preferred embodiments, the locking portion 38 is substantially cylindrical. In most preferred embodiments, locking portion 38 is somewhat parabolic in shape, since it increases in circumference and width as it extends away from base portion 34 and approaches distal end 33. Thus, locking portion 38 tapers from a maximum width near distal end 33 to a minimum width adjacent the intersection of base portion 34 and locking portion 38.

Locking portion 38 includes a slot 42 at distal end 33, defining oppositely disposed tabs 44 and 46. Tabs 44 and 46 are spaced a distance from each other and are substantially parallel. It is important that these tabs 44 and 46 not be flat, but instead be of a width sufficient to permit limited lateral movement when compressed together, and have sufficient strength to resist permanent deformation and return to their original position when the compressive force on them is removed. In the preferred embodiment, each tab 44 and 46 includes an aperture 48 and 50 respectively on its base surface 55. Apertures 48 and 50 are sized so that the prongs of a tool (not shown) can be inserted therein. With the prongs of the tool inserted in the apertures 48 and 50, the tabs 44 and 46 can be readily compressed together to facilitate removal of the locking portion 38 from the bore 26 to permit lens replacement. Apertures 48 and 50 therefore significantly increase the ease by which locking portion 38 may be released from locking compartment 28.

With reference to FIG. 1 and 4, the locking portion 38 of frame 10 is in the unlocked condition, extending freely from the base portion 34. Locking portion 38 is configured so that it can be inserted and secured within locking compartment 28 of lug 26.

Figure 7:
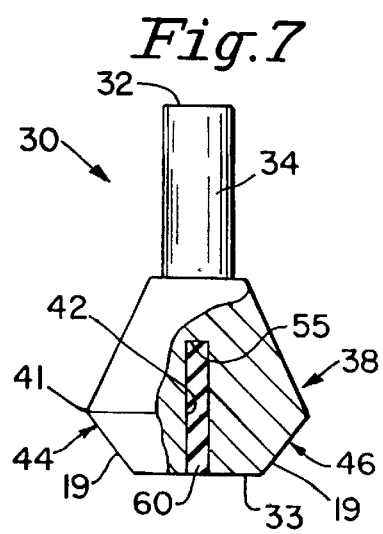
FIG. 7 is a perspective view in section of the locking element according to the present invention.

With reference also to FIG. 7, the locking element 30 may include an insert 60 which is preferably constructed of a resilient material such as rubber or another elastomeric compound. The insert resists bending or deformation of tabs 44 and 46, when the tabs are compressed together. Additionally, insert 60 is intended to enhance the long term use of the locking element 30 and its automatic locking action by constantly urging the tabs 44 and 46 to return to their pre-compressed positions. The insert is permanently attached in the slot 42 by glueing, swaging or the like. The insert 60 can fill the entire slot as illustrated in FIG. 7, or be tapered adjacent the base surface 55 so that it is not in contact with the tabs 44 and 46 along the entire length of slot 42.

With reference now to FIGS. 1 and 4, the locking element 30 will be described as it used in connection with eyeglass frames 10. As discussed above, the base portion 34 is rigidly secured into lug 24 of top rim 18. This results in locking portion 38 extending toward bottom rim 20. In order to secure bottom rim 20 to top rim 18, lug 26 is moved towards lug 24. At this time, tabs 44 and 46 are compressed and squeezed together as they enter locking compartment 28. This is facilitated by the tapered surface 19 of the tabs adjacent the distal end 33 of the element 30 between the edge 41 and the end 33. Once it contacts the inside of the bore 27 of the lug 26, the tapered surface 19 urges the tabs to compress and move toward each other temporarily decreasing the overall width of the locking portion 38. The tabs 44 and 46 then proceed through the locking compartment 28 until the edge 41 passes therethrough and each tab is received into a respective recess 61 and 62 of locking compartment 28. Recesses 61 and 62 are wider than the remainder of the bore 27. When tabs 44 and 46 are received in recesses 61 and 62, respectively, a compressive force is no longer being exerted thereon. The tabs 44 and 46 then return to their initial position, preventing the locking element 30 from being released from locking compartment 28. This automatically locks the frame 10 around the lenses and thereafter safeguards against accidental release by requiring compression of both tabs 44 and 46 (and in some cases the insert 60) to disengage them from the recesses 61 and 62.

The locking element 30 is released by squeezing tabs 44 and 46 together. With particular reference to the embodiment illustrated in FIGS. 3 and 4, because the distal end 33 of locking element 30 is aligned and planar with a bottom surface 64 of lug 26, locking element 30 is preferably released by making use of apertures 48 and 50. In order to squeeze tabs 44 and 46 together to release them from recesses 61 and 62, a tweezers-like tool (not shown) is inserted into apertures 48 and 50, which is then used to squeeze tabs 44 and 46 together. As tabs 44 and 46 are squeezed together, they are disengaged and removed from recesses 61 and 62, thereby allowing removal of tabs 44 and 46 from locking compartment 28. In this manner, locking element 30 allows for easy removal or replacement of the lens, as well as superior retention of the inserted lens. The locking element 30 can be made of steel or any other metal or material which is durable yet flexible.

Alternatively, the locking element 30 can be released by making use of the space formed between the angled surface 19 and the recesses 61 and 62 of the locking compartment 28. In order to release tabs 44 and 46, the tweezer-like tool is inserted into the space formed between the locking compartment 28 and locking portion 38, thereby allowing tabs 44 and 46 to be compressed together and subsequently released. It should be understood that angled surface 19 may be of any other angle or shape so long as adequate space is provided between the locking compartment 28 and the locking portion 38 to allow for insertion of a tweezer-like tool or the like. Thus, apertures 48 and 50 are not necessary in this embodiment, but may be included.

With reference now to FIG. 5, an alternative embodiment of the invention will be described. The embodiment of FIG. 5 is identical to that of the preferred embodiment except that the locking element 30 is sized so that the length of tabs 44 and 46 extend beyond the bottom surface 64 of lug 26 when they are locked in the locking compartment 28. In this embodiment, the ends extend far enough beyond the surface 64 of lug 26 to permit a tool to directly pinch a portion of outer tapered surface 19 of tabs 44 and 46, in order to move them together and thereby release them from locking compartment 28. Thus, apertures 48 and 50 are not necessary in this embodiment, but may be included.

Figure 6:
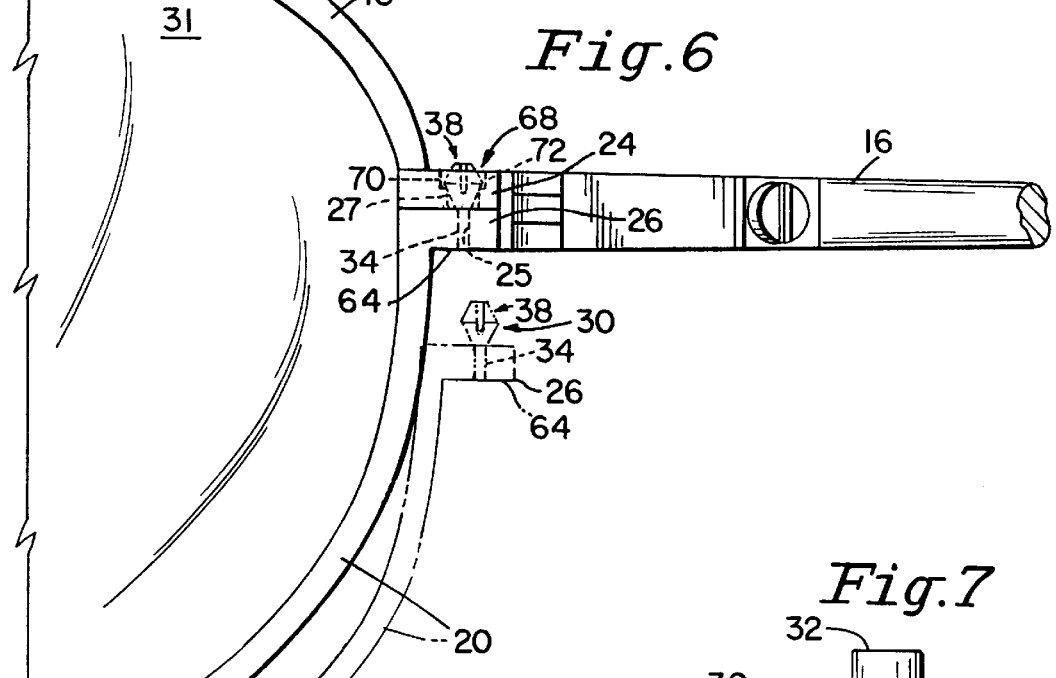
FIG. 6 is a partial front view of an alternative embodiment of the eyeglass frames in the unlocked and locked conditions.

With reference now to FIGS. 3 and 6, further embodiments of the invention will be described. In FIG. 6, base portion 34 of locking element 30 is embedded into the bore 27 of lug 26 of bottom rim 20. Base portion 34 is secured in a bore 27 of lug 26, and shaped in the same way as previously described in connection with mounting it in bore 25 of lug 24. Alternatively, with reference to FIG. 3, the base portion 34 may include a threaded portion 54. In this alternative, typically the bore 27 of lug 26 will likewise be threaded to mate with and retain the threaded portion 54 of the element 30. Thus, the threaded portion 54 of base portion 34 is inserted by screwing it into lug 26, instead of using other means of embedding it therein.

In the FIG. 6 embodiment, the locking portion 38 extends towards lug 24 of top rim 18. Lug 24 includes recesses 70 and 72 which receive tabs 44 and 46 respectively. In similar manner to the FIG. 5 embodiment previously described, by squeezing tabs 44 and 46 together, locking element 30 enters complimentary locking compartment 68 which is disposed within lug 24. Tabs 44 and 46 proceed through locking compartment 68 until each tab is received in their respective recess 70 and 72 of locking compartment 68. The top of each tab 44 and 46 extends slightly above the surface of the top rim 18, allowing for unlocking at a later time. To unlock locking element 30, inward pressure is applied to the outer portion of tabs 44 and 46 that extend above the surface of the top rim 18 and the compressed element 30 is pushed downward into locking compartment 28. Once tabs 44 and 46 are disengaged from recesses 70 and 72, the downward force or movement of lower rim 20 will assist in the unlocking procedure until frame 10 is returned to its natural state. Because tabs 44 and 46 extend above the top surface of lug 24, apertures 48 and 50 are not required, but may be included. While FIG. 6 illustrates tabs 44 and 46 extending above the top rim 18, tabs 44 and 46 may also be sized so that locking element 30 is aligned and planar with the top surface of lug 24. In this embodiment, apertures 48 and 50 may be provided in the element 30 in order to allow release of the locking element 30 from frame 10 as previously described. Alternatively, the locking element 30 may be sized to allow insertion of a tweezer-like tool between the space formed between tabs 44 and 46 and recesses 70 and 72.

With reference now to FIG. 8, an alternative embodiment of locking element 130 will now be described. Locking element 130, like locking element 30 described above, includes a base portion 134 and a locking portion 138. Base portion 134 is identical to base portion 34, and may include any feature described above. Locking portion 138 includes a slot 132 at its distal end 133, defining two oppositely disposed tabs 144 and 146. Opposing tabs 144 and 146 are sized similar to locking element 30 in that they include a tapered surface 119 between its distal end 133 and an edge 141. In contrast to the structure of locking element 30, tabs 144 and 146 of locking element 130 include a non-tapered surface 170 extending from the edge 141 to the intersecting surface 172 of base portion 134 and locking portion 138. Non-tapered surface 170 and intersecting surface 172 are at right angles which allows the locking portion 130 to be more aptly nestled within the recesses of the locking compartment Locking element 130 may also include a rubber insert 160, which is identical to the structure and function of rubber insert 60. It should be understood that locking element 130 may include any feature of locking element 30 as described above.

The above described invention is advantageous in that it may be used with frames constructed according to common industry practice. In addition, it provides a simple yet adequate retention of lens within an eyeglass frame.

Once given the above disclosure many other features, modifications, improvements will become apparent to the skilled artisan. Such features, modifications, and improvements are therefore to be considered as part of this invention, the scope of which is to be determined by the following claims:

I claim:

1. An ophthalmic frame locking mechanism, comprising:

a lens holder for surrounding and securing a rim of an ophthalmic lens, said lens holder being split at a position to define first and second opposing portions;

a releasable locking element having proximal and distal ends, said locking element disposed on said first portion and extending toward said second portion, and including a base portion and a locking portion, said base portion disposed near said proximal end of said element adjacent to said first portion, and said locking portion disposed at said distal end of said element and being greater in width than said base portion, said locking portion including a slot at its distal end, said slot defining oppositely disposed first and second tabs; and a locking compartment disposed on said second portion, said locking compartment for receiving and securing said first and second tabs.

2. The locking mechanism of claim 1, wherein;

an elastic insert is disposed within said slot.

3. The locking mechanism of claim 1, wherein;

said base and locking portions are cylindrical.

4. The locking mechanism of claim 3, wherein;

said base portion is secured to said first portion by embedding a bottom surface of said base portion onto the outer surface of said first portion.

5. The locking mechanism of claim 3, wherein;

said base portion includes an externally threaded end which is received in and secured to a respective internally threaded hole of said first portion.

6. The locking mechanism of claim 1, wherein;

said first portion is the top rim of the ophthalmic frame and said second portion is the bottom rim of the ophthalmic frame.

7. The locking mechanism of claim 1, wherein;

said second portion is the top rim of the ophthalmic frame and said first portion is the bottom rim of said ophthalmic frame.

8. The locking mechanism of claim 1, wherein;

said locking compartment including first and second recesses for receiving and securing said first and second tabs, respectively.

* * * * *

UNITED STATES PATENT AND TRADEMARK OFFICE
CERTIFICATE OF CORRECTION

PATENT NO. : 5,917,575
DATED : June 29, 1999
INVENTOR(S) : Alan Cunningham

It is certified that error appears in the above-indentified patent and that said Letters Patent is hereby corrected as shown below:

Insert drawing, figure 8 as follows:

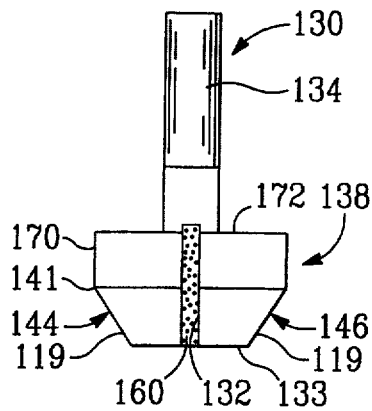

Signed and Sealed this

Sixth Day of June, 2000

Attest:

Q. TODD DICKINSON

*Attesting Officer*          *Director of Patents and Trademarks*